United States Patent [19]
Burke et al.

[11] Patent Number: 4,754,196
[45] Date of Patent: Jun. 28, 1988

[54] AXIAL INJECTION ORBITRON

[75] Inventors: John M. Burke, Alexandria, Va.; Wallace M. Manheimer, Silver Spring, Md.

[73] Assignee: The United States of America as represented by the Secretary of the Navy, Washington, D.C.

[21] Appl. No.: 940,145

[22] Filed: Dec. 10, 1986

[51] Int. Cl.[4] .............................................. H01J 25/00
[52] U.S. Cl. ...................................... 315/5.29; 315/4; 315/5; 315/5.34; 315/5.38; 328/228
[58] Field of Search ................ 315/4, 5, 5.34, 5.41, 315/3, 5.29, 5.38; 372/2; 328/227, 228, 233; 330/4

[56] References Cited

U.S. PATENT DOCUMENTS

| | | | |
|---|---|---|---|
| 2,986,672 | 5/1961 | Vaccaro et al. | 315/5.34 |
| 3,398,376 | 8/1968 | Hirshfield | 315/4 |
| 3,463,959 | 8/1969 | Jory et al. | 315/5 |
| 4,253,068 | 2/1981 | Barnett | 315/4 X |
| 4,412,150 | 10/1983 | Alexzeff | 315/4 |
| 4,422,045 | 12/1983 | Barnett | 330/4 |
| 4,459,511 | 7/1984 | Alexeff | 315/4 |
| 4,507,614 | 3/1985 | Prono et al. | 328/233 |
| 4,571,524 | 2/1986 | Mourier | 315/4 |

OTHER PUBLICATIONS

Burke et al. "The Axial Injection TEM Orbitron Maser", NRL Memorandum Report 5675, Jan. 31, 1986.

Primary Examiner—David K. Moore
Assistant Examiner—Mark R. Powell
Attorney, Agent, or Firm—Thomas E. McDonnell; Brian C. Kelly

[57] ABSTRACT

An apparatus and method for generating high power electro magnetic radiation in the millimeter or submillimeter range axial injection and adiabatic compression of an electron beam using large electric fields in an evacuated AXIOM (Axial Injection Orbitron Maser).

6 Claims, 5 Drawing Sheets

AXIAL INJECTION ORBITRON

BACKGROUND OF THE INVENTION

The development of the electron cyclotron maser (or gyrotron) has made possible the high efficiency generation of high power millimeter electromagnetic waves. The major drawback of gyrotron devices, however, is that they require a large magnetic field and a high energy electron beam. First harmonic generation of 1 millimeter waves in a gyrotron would require a magnetic field larger than 100,000 gauss. The physical size of the more conventional devices that do not require the use of large magnetic fields to produce high frequency radiation, such as the carcinotron, must be quite small to operate in the millimeter regime and this limits them to output powers of no greater than a few watts.

The orbitron maser concept, first proposed by Alexeff, has been demonstrated to produce high power millimeter and submillimeter electromagnetic radiation without the use of a magnetic field. However, Alexeff in U.S. Pat. Nos. 4,412,150 and 4,459,511 required voltage pulses in the range of 2000 volts and his theoretical description of the device assumed the orbits were circular about the center conductor. The present invention discloses the actual character of the electrons orbits have been shown to be noncircular and discloses a method requiring lower voltages. Alexeff's orbitron employs a coaxial cylindrical geometry with the inner conductor held at a positive electrostatic potential with respect to the outer conductor. Electrons are introduced into the interaction region by creating a glow discharge plasma between the inner and outer conductor and are electrostatically trapped axially so that they remain in the interaction region for a long period of time. The glow discharge, radial injection orbitron with axial trapping has several problems: low efficiency, poor mode control and inability to operate as a continuous wave. We have shown that these problems are obviated by using an axial electron injection and compression scheme similar to that used in most electron cyclotron maser devices. The disclosed method is termed AXIOM (Axial Injection Orbitron Maser).

SUMMARY OF THE INVENTION

The invention encompasses an Axiom apparatus for producing microwaves including: a cylindrical housing with an axial electron injection system for injecting electrons into the housing positioned at a first end. The housing has a center conductor axially centered and running the length of the housing, and an outer conductor lining a portion of the housing near the first end and having a negative electrostatic potential with respect to the center conductor, thus forming a radial electric field for holding the electrons in a noncircular orbit, about the center axis, in which said electrons progress toward a second end. The apparatus further includes a beam compression region having an axially increasing radial electric field, as one progresses toward the second end wherein the electron density and ratio of perpendicular to parallel energy is increased.

The apparatus further includes a cavity region having a large electric field where said electrons interact through the negative mass instability to produce millimeter waves. The Axiom apparatus includes a beam re-expansion region having a second outer conductor lining a portion of the housing, and a decreasing radial electric field which decreases until the second outer conductor has the same electrostatic potential as the center conductor.

The Axiom apparatus further includes a collector region having a third outer conductor lining a portion of the housing, which is at the same electrostatic potential as the center conductor. Thus, the orbiting electrons are collected on the third outer conductor. The Axiom apparatus also has an output waveguide at the second end through which pass the waves of radiation.

The invention also includes a method for producing microwaves including the steps of: axially injecting electrons with a large value of axial momentum and some radial momentum into a radial electric field being emitted from a center conductor at a positive electrostatic potential with respect to a first outer conductor said electrons propagate in a non-circular path about said center conductor and away from the axial injection system; and adiabatically compressing the electrons through progressively increasing the strength of the radial electric field in an axial direction away from the injection means, by increasing the negative potential of a compressor on a region conductor.

The method includes: coupling the electrons with a cavity designed to transfer energy to radiation fields, reducing to extinguishment the radial electric field, and collecting the orbiting electrons in a collection conductor with equal electrostatic potential with respect to the center conductor, and passing the newly produced radiation fields through a vaccum window into an output waveguide.

An object of the invention is the generation of high power electro-magnetic radiation in the millimeter or submillimeter wave regions without the use of large magnetic fields.

Another object is a high efficiency economic Orbitron Maser, that has highly tuned mode control. A further object is continuous wave operation capability. An additional object is the capability of acting at a range of power levels.

DETAILED DESCRIPTION

Figure 1:
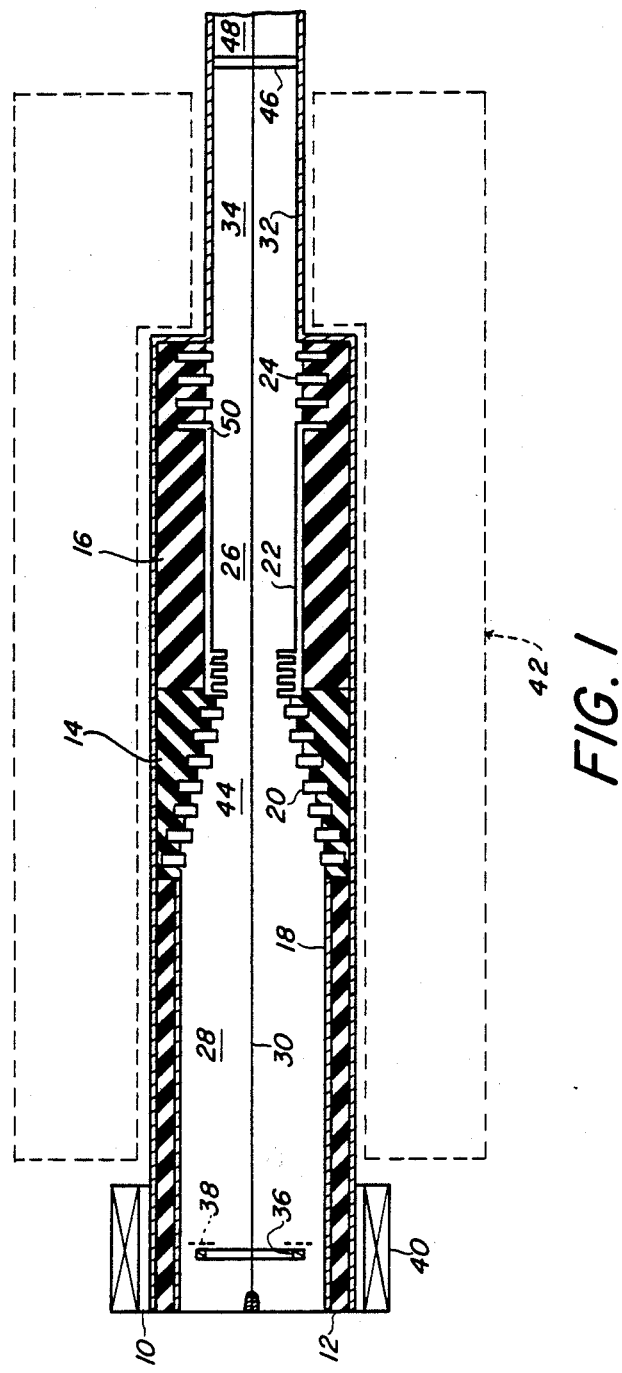
FIG. 1 is a partial cross sectional of the Axiom.

FIG. 1 shows Axiom apparatus having an axially symmetric, cylindrical housing 10 is a grounded vacuum wall and is lined with insulators 12, 14 and 16 which electrically insulate the outer conductor 18, the compression rings 20, the cavity conductor 22, and the decompression rings 24 from each other so that they can be held at different voltages. The insulator 14 provides a dual purpose: it insulates the compression rings 20 from each other and, in addition, the insulator 14 also absorbs microwave radiation that might escape backward from the mode cavity 26 in order to prevent leakage of radiation into the beam injection region 28.

The outer conductor 18 lines a portion of the interior of the housing 10, and provides a radial electric field by being held at a negative electrostatic potential with respect to the center conductor 30 which is axially centered as shown in FIG. 1. The cavity conductor 22 lines the inner surface of the mode cavity 26 and has a large negative electrostatic potential with respect to the center conductor 30 producing a large radial electric field in the mode cavity 26 The collector conductor 32 lines the collector region waveguide 34, and is equal potential with respect to the center conductor 30 no longer radially confined the travelling electrons are collected on the inner surface of the collector conductor 32.

Figure 2:
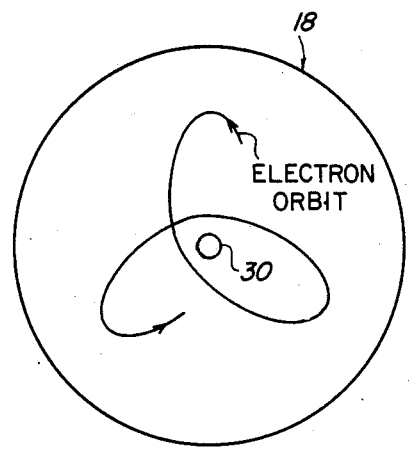
FIG. 2 is a partial cross sectional view along the axis of the Axiom tracing the orbit path of the electrons.

The Axiom apparatus operate as follows: electrons are injected with a large value of axial momentum and some radial momentum from a cathode 36 through a grid 38 into a beam injection region 28. The radial electric field between the outer conductor 18 and the center conductor 30 acts upon the electrons. In one embodiment of the invention a magnetic field coil 40 is used to form a small magnetic field at the cathode 36 in order to assist the electron injection mechanism, and a magnetic shield 42, removes the effect of the magnetic field as the electron moves toward the beam compression region 44. Due to the conservation of canonical angular momentum the electrons-center conductor in a generally semi-spiral orbit as shown axially in FIG. 2. The design equations for the axial injection scheme are presented in section VII-E of Naval Research Lab Memo Report No. 5675. The electrons progress toward the compression region 44 where they are adiabatically compressed as they are slowed by the axially increasing electric field which is a product of metallic rings 20 of decreasing diameter which are held at an axially increasing negative potential one moves toward the mode cavity 26. The adiabatic compression increases the electron density as well as the ratio of the perpendicular to parallel energy of the electrons. The resonant energy transfer process from the electron beam to the radiation fields is analyzed in detail in NRL Memo Report 5675. In summary equations that relate the parameters a, b, $r_o$, $V_o$ and $\alpha$ in the compression region to their values as they exit the injection region, a', b', $r_o'$, $V_o'$ and $\alpha'$, $$r_o \sqrt{P_o} = r_o' \sqrt{P_o'}$$

and $$\frac{\alpha^2}{(1+\alpha^2)} \frac{P_o'}{P_o} + \frac{P_o'}{H_o} \ln\left[\frac{\sqrt{P_o}\ a}{\sqrt{P_o'}\ a'}\right] = \frac{\alpha'^2}{(1+\alpha^2)}$$

-continued $$P_o' = \frac{eV_o'}{\ln\left[\frac{b'}{a'}\right]},$$

where $$P_o = \frac{eV_o}{\ln\left[\frac{b}{a}\right]}$$

and $$\alpha = \sqrt{\frac{H\perp}{H\|}}$$

is the square root of the ratio of the parallel to perpendicular energy of the electron and $H_o$ is the kinetic energy of the electron.

Figure 3:
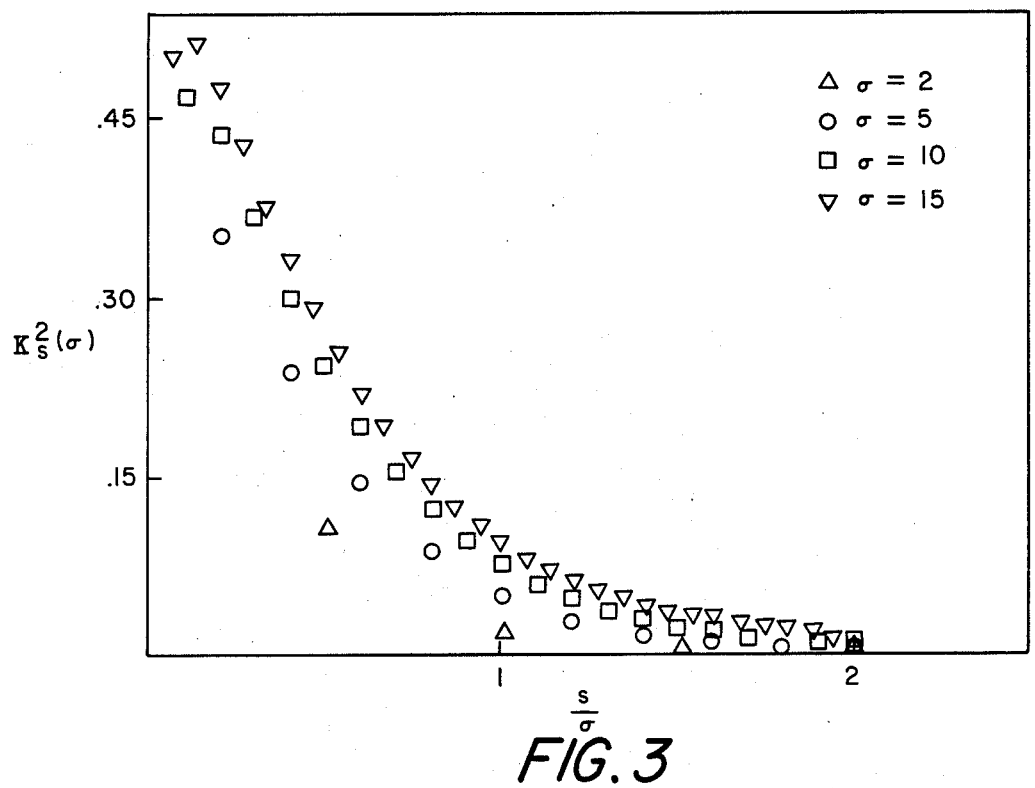
FIG. 3 is a graph showing the coupling coefficient $K_s^2(\sigma)$ vs harmonic number for various values of $\sigma$.
Figure 4:
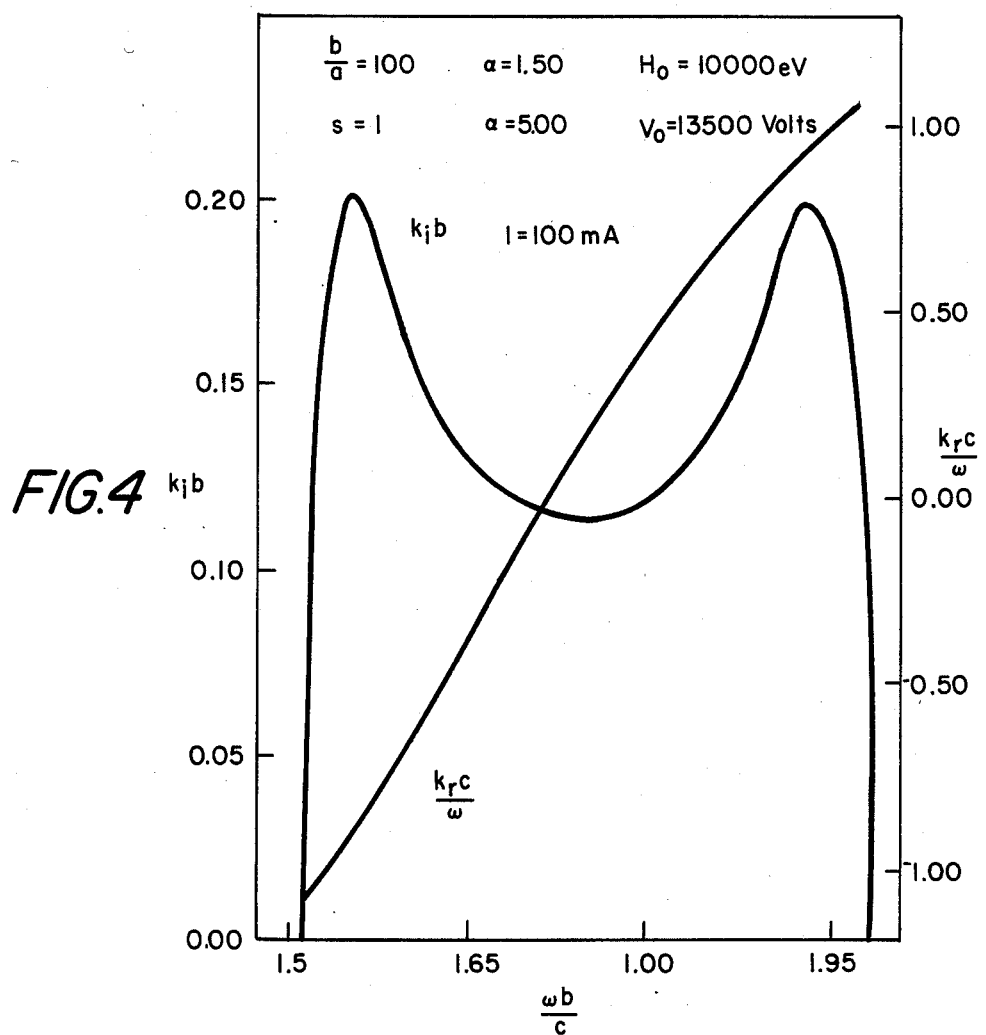
FIG. 4 is the spacial growth rate and wave number vs frequency for an orbitron.
Figure 5:
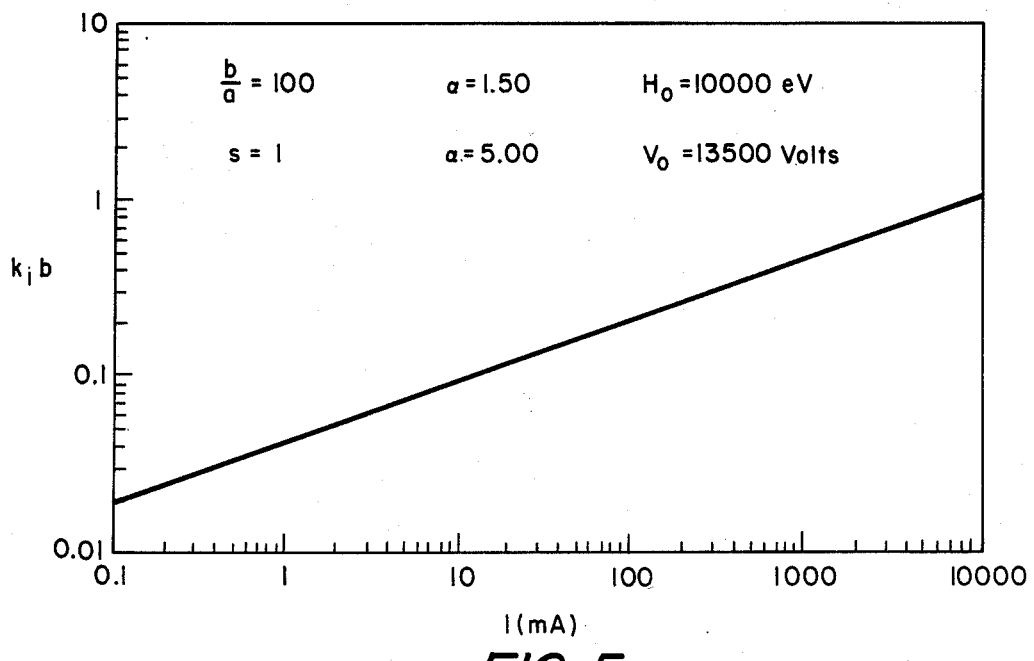
FIG. 5 the spacial growth rate vs the electron beam for an orbitron.
Figure 6:
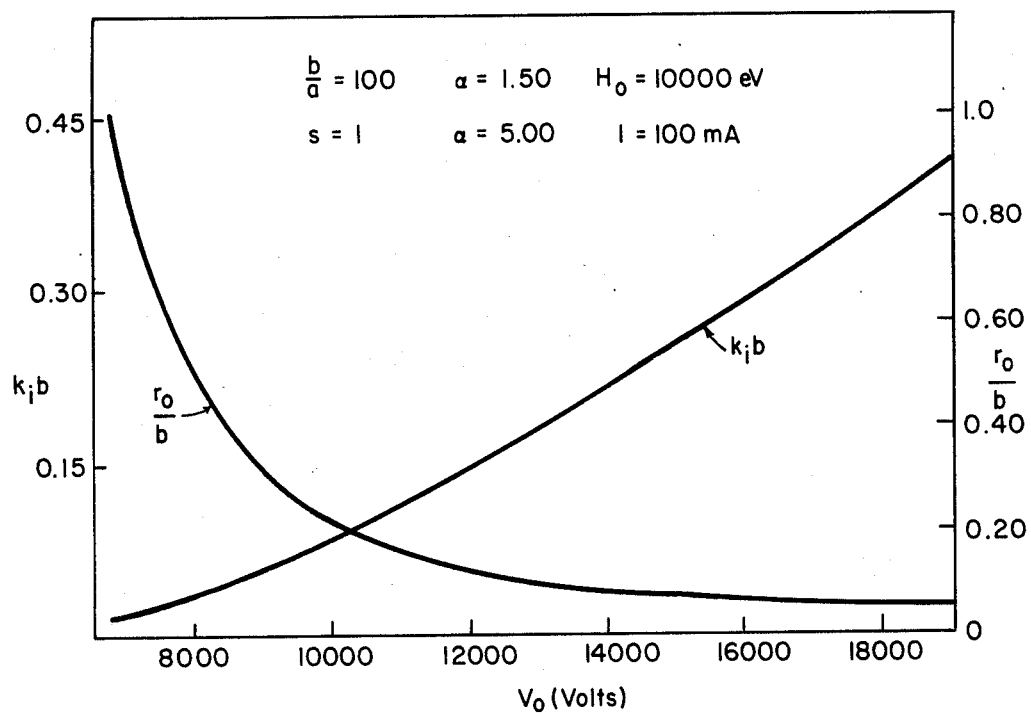
FIG. 6 is a graph showing the spacial growth rate and the maximum electron radius vs the voltage between the center and outer conductor for an orbitron.
Figure 7:
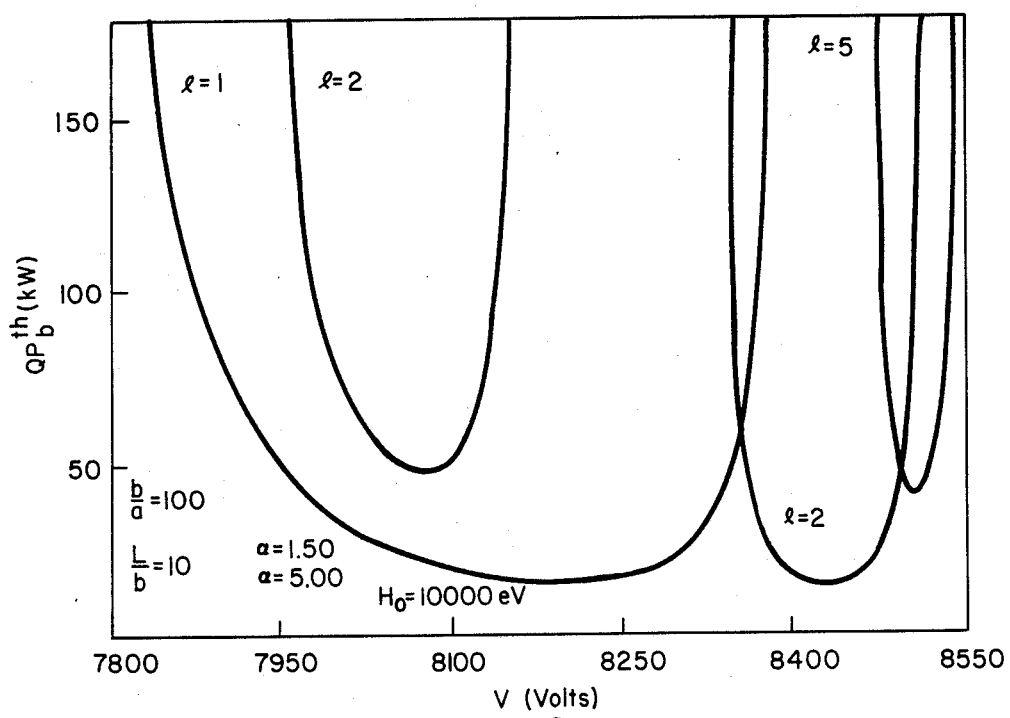
FIG. 7 is a graph showing the cavity Q multiplied by the threshold beam power required for self-oscillator vs the voltage between the center and outer conductor for various mode numbers in an orbitron oscillator.
Figure 8:
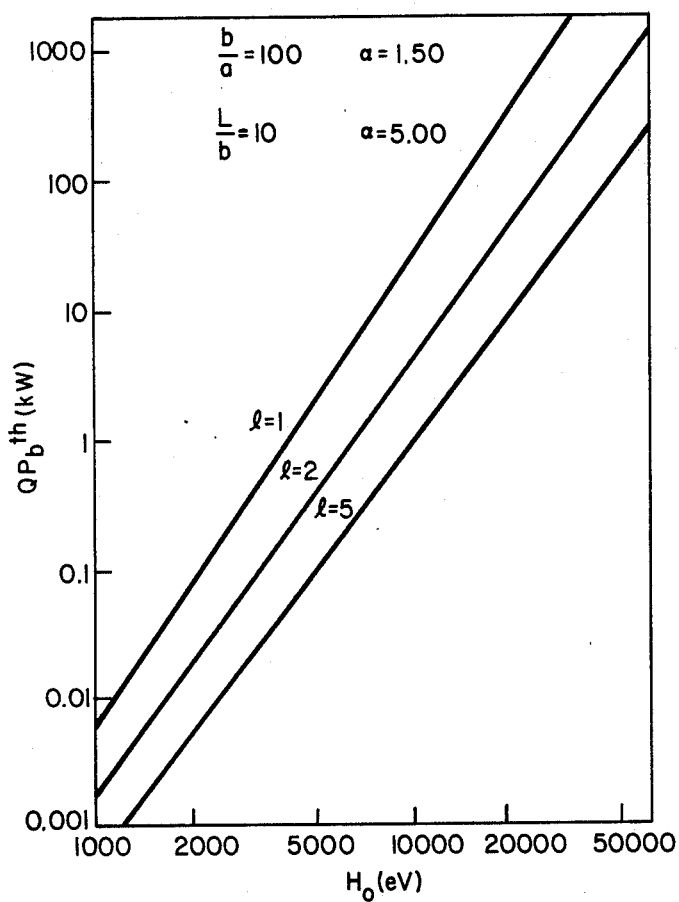
FIG. 8 is the cavity Q multiplied to the threshold beam power required for self-oscillator vs the electron beam energy for various mode numbers in an orbitron oscillator.
Figure 9:
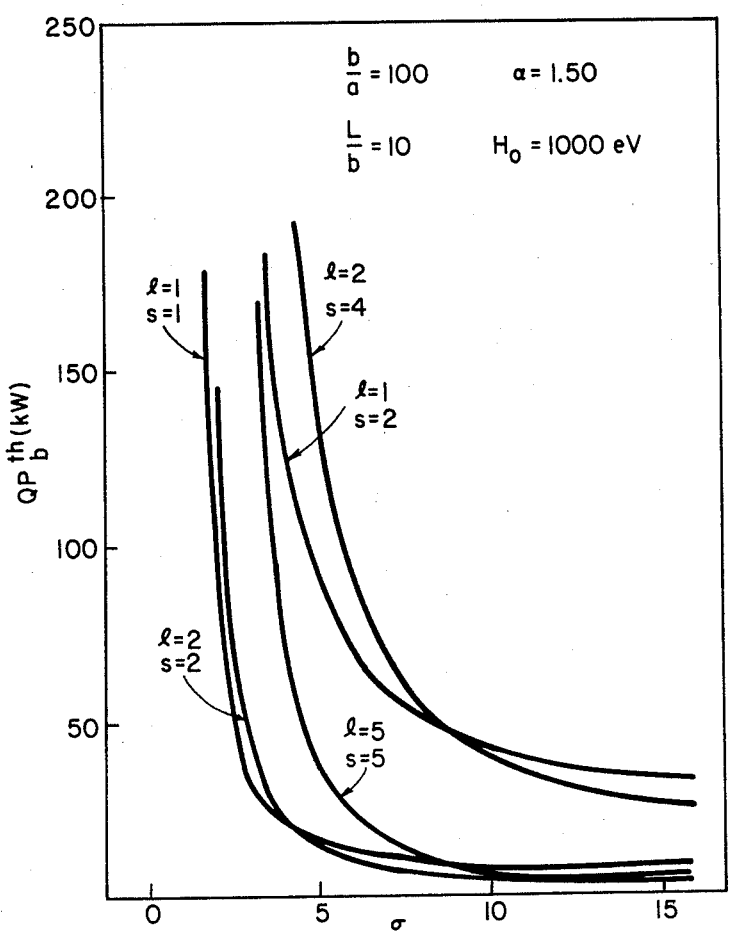
FIG. 9 is the cavity Q multiplied by the threshold beam power reuired for self-oscillator vs the parameter for various mode and harmonic numbers in and orbitron oscillator.

The radial oscillation frequency, f, of an electron in a highly eccentric low angular momentum orbit with radial oscillation amplitude $r_o$ is $$f \approx \frac{g(\sigma)}{r_o(\text{mm})} \sqrt{\frac{V_o(kv)}{\ln\left(\frac{b}{a}\right)}}\ (ghz)$$

where b is the radius of the outer conductor, a is the radius of the inner conductor, and the numerical coefficient, $g(\sigma)$ has a weak dependence of the eccentricity of the orbit, $\sigma$, but is roughly equal to 5. To provide high frequency operation at low values of the voltage, $V_o$, which is the voltage between the cavity center (5) and outer (11) conductor, we exploit the rich harmonic content of the noncircular electron orbits in the orbitron. The coupling coefficient of the TEM mode to harmonics of the electron's radial oscillation period, denoted by s, is shown in FIG. 3. as a function of the parameter $\sigma$ which is defined as the ratio of the maximum to the minimum radius of the electron's orbit. FIG. 3 shows that there is good coupling to the TEM mode for s $\sigma/2$. Highly eccentric orbits also allow electrons with large values of radial oscillation amplitude to interact with the large electric field near the center conductor avoiding the problem of having to inject electrons with a small radial oscillation amplitude into the interaction region. FIGS. 4-6 also present the spacial growth rate versus various parameters for an infinite length TEM orbitron amplifier. The growth rate is found by evaluating the dispersion relation for the axially uniform TEM orbitron for the electron beam distribution function. The threshold values of the electron beam power required for self-oscillation in a finite length oscillator configuration are shown in FIGS. 7-9. The start power is computed by combining the calculation of the electron beam power transferred to the cavity radiation fields with the definition of the cavity Q. The specific electron beam distribution function is used here also.

In the mode cavity 26 the radiation waves are formed by the oscillations of the electrons. The decompression rings 24 axially reduce the radial electric field to zero potential with respect to the central conductor 30, by being held at an axially decreasing negative potential as one moves toward the collector region 34. The electrons, no longer being confined in the radial field are collected on the inner surface of the collector conductor 32. The radiation fields output from the mode cavity 26 are coupled to the collector region 34 by tuning the length of the radial waveguide 50 at the end of the mode cavity and the radial length of the decompression rings 24 to optimally mismatch the impedence of the collector region 34 at the desired operating frequency.

The radiation fields exit through the vacuum window 40 into the output waveguide 48.

In another embodiment the TE mode could be used by having a cutoff section at the entrance to the mode cavity 26 rather than the TEM mode as configured.

Another embodiment would use a non-azimuthally symetric TEM mode cavity with axial strips of dissipative material to reduce TE mode competition in a TEM mode cavity.

A further embodiment would taper the radius of the 5 cavity conductor 22 over its length to tailor the electric 6 field for optimal efficiency operation.

An additional embodiment would depress the electrostatic potential of the collector conductor 32 to extract the residual energy of the electron beam after it leaves the mode cavity 26.

Still a further embodiment would eliminate the magnetic field coil 40 and the magnetic shield 42 and use a non-azimuthally symmetric cathode 36 and grid 38.

A further embodiment would vary the radial electric field in the cavity region by varying the voltage as a function of axial position in the cavity.

Obviously many modifications and variations of the present invention are possible in light of the above teachings. It is therefore to be understood that within the scope of the appended claims the invention may be practiced other than as specifically described.

What is claimed:

1. An apparatus for producing microwaves comprising:
    a tubular housing with an axial electron injection means positioned at a first end for injecting electrons into said housing;
    a center conductor axially centered within the length of said housing;
    a first outer conductor lining a portion of said housing at said first end, and having a negative electrostatic potential with respect to said center conductor, said potential results in a first axial electric field for holding said electrons in orbit of said center conductor progressing toward a second end;
    a beam compression region downstream of said electron injection means and said first outer conductor comprising an axially increasing radial electric field, said radial electric field being at a minimum nearest said first end, wherein the density of said electrons are increased;
    a cavity region downstream of said beam compression region having a large radial electric field where said electrons interact to form waves of radiation;
    a beam re-expansion region downstream of said cavity region comprising a second outer conductor lining a portion of said housing, and a decreasing radial electric field which decreases until said second outer conductor is at the same potential as said center conductor;
    a collector region downstream of said beam re-expansion region comprising a third outer conductor lining a portion of said housing, which collects the orbiting electrons due to its equal potentiality with respect to said center conductor, and a waveguide tuned to optimize said waves of radiation; and
    an output waveguide at a second end of said housing through which pass said waves of radiation.

2. An apparatus for producing microwaves as described in claim 1 wherein said beam compression region further comprises:
    a series of decreasing diameter rings, said rings being of maximum diameter nearest said first end, each ring having progressively more negative electrostatic potential.

3. An apparatus for producing microwaves as described in claim 1 wherein said axial electron injection means comprises:
    a cathode from which electrons are injected with a large value of axial momentum and some radial momentum; and
    a grid through which said electrons are injected into said radial electric field.

4. An apparatus for producing microwaves as described in claim 3, further comprising a magnetic field coil used to provide a small axial magnetic field at said cathode, and a magnetic shield enclosing said housing which cancels the effect of said magnetic field as said electrons progress toward said second end.

5. An apparatus for producing microwaves as described in claim 1, further comprising a vacuum acting within the housing and a vacuum window at said second end through which said radiation waves pass.

6. A method for producing microwaves comprising:
    axially injecting electrons by an axial injection means a large value of axial momentum and some radial momentum into a radial electric field being emitted from a center conductor at a positive electrostatic potential with respect to a first outer conductor, thereafter said electrons propagate in a orbital path about said center conductor;
    adibatically compressing said electrons by progressively increasing the strength of said radial electric field in an axial direction away from said injection means, by increasing the negative potential of a compression region conductor;
    coupling said electrons with a cavity mode in a resonant cavity to transfer energy to radiation fields;
    reducing to extingushment the effects of said radial electric field downstream of said resonant cavity;
    collecting said orbiting electrons in a collection conductor with equal electrostatic potential with respect to said center conductor; and
    passing said radiation fields through a vacuum window into an output waveguide.

* * * * *